United States Patent
Cho et al.

(10) Patent No.: US 7,435,377 B2
(45) Date of Patent: Oct. 14, 2008

(54) WELDABLE ULTRAHARD MATERIALS AND ASSOCIATED METHODS OF MANUFACTURE

(75) Inventors: Hyun Sam Cho, Salt Lake City, UT (US); Kyung Ryul Han, ChunAhn-si (KR); Tim Valentine, Surrey (GB)

(73) Assignee: ADICO, Asia Polydiamond Company, Ltd., Kyungki-do (KR)

( * ) Notice: Subject to any disclaimer, the term of this patent is extended or adjusted under 35 U.S.C. 154(b) by 251 days.

(21) Appl. No.: 11/200,860

(22) Filed: Aug. 9, 2005

(65) Prior Publication Data

US 2007/0034416 A1    Feb. 15, 2007

(51) Int. Cl.
*C23C 16/22* (2006.01)
(52) U.S. Cl. .................. 419/14; 264/125; 228/903; 419/18
(58) Field of Classification Search .......... 228/903; 419/14, 18; 264/125
See application file for complete search history.

(56) References Cited

U.S. PATENT DOCUMENTS

| | | | |
|---|---|---|---|
| 3,745,623 A * | 7/1973 | Wentorf et al. | 76/115 |
| 4,906,528 A | 3/1990 | Cerceau et al. | |
| 5,009,673 A * | 4/1991 | Cho | 264/125 |
| 5,030,276 A | 7/1991 | Sung et al. | |
| 5,075,053 A | 12/1991 | Bernadic et al. | |
| 6,454,027 B1 | 9/2002 | Fang et al. | |

* cited by examiner

*Primary Examiner*—Archene Turner
(74) *Attorney, Agent, or Firm*—Thorpe North & Western LLP

(57) ABSTRACT

A weldable ultrahard insert can include an ultrahard working layer and a weldable metal layer metallically bonded with the working layer. The ultrahard working layer can be any ultrahard material such as PCD, PCBN, metal carbide, ceramic, diamond, or the like. The weldable ultrahard inserts can be formed by charging a reaction vessel with ultrahard materials, including precursors thereof, and placing a weldable metal layer in the reaction vessel with an optional intermediate layer. The assembly can be subjected to a pressure and a temperature sufficient to metallically bond the weldable metal layer to the ultrahard material. The weldable layer is formed as part of the insert in situ which facilitates subsequent welding of the insert to a tool substrate without risking damage to the ultrahard material.

11 Claims, 1 Drawing Sheet

WELDABLE ULTRAHARD MATERIALS AND ASSOCIATED METHODS OF MANUFACTURE

FIELD OF THE INVENTION

The present invention relates generally to ultrahard materials which are attached to tool substrates by welding. These ultrahard materials can be used in rock coring, drilling, cutting, grinding, polishing, and other material removal applications. Accordingly, the present application involves the fields of materials science, chemistry, and ultrahard cutting tools.

BACKGROUND OF THE INVENTION

Polycrystalline diamond (PCD), polycrystalline cubic boron nitride (PCBN), and other ultrahard materials are available with a cemented tungsten carbide substrate or as freestanding bodies. These materials are conventionally joined to other materials such as steel which acts as a supporting mass, e.g., for a tool substrate. The methods available for fabrication of this joint are limited because of the physical and chemical properties of the cemented tungsten carbide. In particular, cemented tungsten carbide has a low coefficient of thermal expansion and poor resistance to thermal shock. To date, brazing tends to be the predominant attachment method. However, brazing has a number of disadvantages such as high cost, poor hot hardness, and limited shear strength. In addition, the quality of the brazing product can depend largely on the skill and experience of the operator. For example, forming a braze joint with high integrity can be difficult. Further, maintaining diamond integrity can be difficult while preventing graphitization and/or oxidation of the diamond. The materials used in brazing are typically ecologically non-friendly and the brazing process cannot be easily automated.

Other methods have been used to attach ultrahard materials to tool substrates with limited success. For example, mechanical techniques such as clamping, and non-metallic adhesives are alternative joining techniques, but both are very limited in application.

As such, improved materials and methods which can be used to enhance bonding of ultrahard materials to a tool substrate resulting in a high quality product which is also economical in production continues to be sought through ongoing research and development efforts.

SUMMARY OF THE INVENTION

Accordingly, the present invention provides materials and methods for production of ultrahard materials and tools which avoid most of the above-mentioned difficulties.

In accordance with one aspect of the present invention, a weldable ultrahard insert can include an ultrahard working layer and a weldable metal layer metallically bonded with the working layer.

In one detailed aspect, the ultrahard working layer can be any ultrahard material such as, but not limited to, PCD, PCBN, metal carbide, ceramic, diamond, or the like.

The weldable ultrahard inserts of the present invention can be formed by a method which includes charging a reaction vessel with an ultrahard material. The ultrahard material can be preformed or can be in a powdered or green state. A weldable metal layer can be placed adjacent the ultrahard material in the reaction vessel to form a precursor assembly. The precursor assembly can be subjected to a pressure and a temperature sufficient to metallically bond the weldable metal layer to the ultrahard material.

As a result, the weldable metal layer allows the ultrahard material to be readily welded to a tool substrate using conventional welding without risking damage to the ultrahard material. Thus, the present invention provides a method of joining PCD, PCBN, cemented carbide, and their variants to a supporting mass by means of welding. Although any suitable welding process can be used to weld the weldable ultrahard inserts of the present invention, several exemplary processes can include laser, electron-beam, and friction (inertia) welding, as these processes can concentrate generated heat into a highly localized area. Other laser welding methods could be employed, provided that they have similar heating characteristics.

The present invention overcomes many of the disadvantages associated with brazing, mechanical attachment, and non-metallic adhesives, and provides a means for the expansion of PCD, PCBN, and their variants, into wider application areas. Laser weldable PCD and PCBN can provide a new product which is more favorable and can be designed to a customer's demands. For example, tools with better joint design for PCD attachment can improve the quality, reliability, and final tool manufacturing cost. Such improvements are important business factors that can ensure the final tool is joined with PCD and PCBN attachment into the tool shank (e.g. steels) more strongly and securely and also more cost effectively. Furthermore, the new laser weldable product can provide customers even wider application options where the conventional PCD and PCBN (as shown in FIG. 1) and like products are limited due to their technical and economic drawbacks. Laser weldable products in accordance with the present invention can be attached into the tool body more strongly by a simple laser welding method with no extra brazing process. Such products allow much broader application and simpler implementation in nearly every ultrahard application area including construction industries like rock coring, drilling, and even grinding and polishing. Accordingly, the overall cost, including labor, can be more cost effective as compared to ultrahard tools made using conventional brazing methods. Application areas of the laser weldable product even with PCD like material as well as standard PCD and PCBN will be much larger and broader like woodworking, metalworking, and construction industries where concerns over joint bond strength as well as potential heat damage on the PCD product during conventional brazing method have been a limiting factor in the past.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
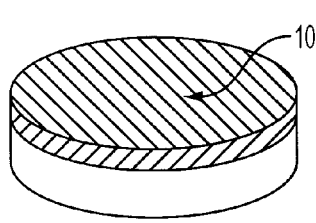
FIG. 1 shows a side perspective view of a typical PCD or PCBN on a cemented tungsten carbide substrate in accordance with the prior art.

The drawings will be described further in connection with the following detailed description. Further, these drawings are not necessarily to scale and are by way of illustration only such that dimensions and geometries can vary from those illustrated.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an," and "the" include plural referents unless the context clearly dictates otherwise. Thus, for example, reference to "a layer" includes one or more of such layers, reference to "a metal" includes reference to one or more of such materials, and reference to "an HPHT step" includes reference to one or more of such steps.

Definitions

In describing and claiming the present invention, the following terminology will be used in accordance with the definitions set forth below.

As used herein, "weldable" refers to the ability of a material to be welded to a tool substrate using conventional welding techniques. Typical ultrahard inserts utilize tungsten carbide as a support layer. However, tungsten carbide is not a weldable material and must generally be attached using brazing or other methods. Most metal carbides are not weldable and are therefore unsuitable for use as the weldable metal layer.

As used herein, "welding" refers to a process of joining or bonding metal materials by application of heat sufficient to melt the metals and result in fusing of the two materials. In contrast, brazing utilizes a third brazing material to join two other materials, typically at a higher temperature.

As used herein, "metallically bonded" refers to bonding between metal atoms which can include alloying, interdiffusion, or other bonding which is not merely mechanical attachment, e.g. a non-chemical bonding braze or adhesive.

As used herein, "thermally stable polycrystalline material" refers to a material which is bonded together primarily by cementing adjacent particles via a secondary material rather than by sintering.

As used herein, "chemically bonded" refers to bonding which involves interatomic interactions such as covalent bonding, intermetallic bonding, or the like. Chemically bonded layers can also include mechanical bonding via interdiffusion or other mechanisms.

As used herein, "vacuum" refers to a pressure condition of less than $10^{-2}$ torr.

As used herein, "metallic" refers to a metal, or an alloy of two or more metals. A wide variety of metallic materials are known to those skilled in the art, such as aluminum, copper, chromium, iron, steel, stainless steel, titanium, tungsten, zinc, zirconium, molybdenum, etc., including alloys and compounds thereof.

As used herein, "cermet" refers to a material having both metal and ceramic components. Examples of cermet materials include, but are not limited to, metal carbides, borides, oxides, silicides, and the like. Some of the more commercially common cermets include titanium carbides, alumina, uranium oxides, and composites of these materials. Cermets can be formed by sintering of ceramic and metal powders. Cermets can include components such as titanium, tungsten, carbon, nitrogen, cobalt and the like which facilitate bonding with the weldable layer.

As used herein, "insert" refers to a body which can be attached to a tool substrate to form a useful tool such as for cutting, grinding, polishing or the like. For example, inserts can include cylindrical inserts for attachment to large cutting drill bits or can cover smaller inserts which are obtained by cutting larger inserts into small pieces of a desired shape, e.g. for welding to saw blade tips.

As used herein, "binder agent" refers to a material which acts to bind ultrahard particles of diamond and/or bonding medium such as cBN together. The binder agent can typically form covalent bonds; however, some mechanical bonding can also be present. Although other materials can be suitable inorganic binder agents can include, but are not limited to, silicon, titanium, rhenium, nickel, tungsten, molybdenum, niobium, vanadium, chromium, manganese, and compounds or alloys thereof.

As used herein, "bonding medium" refers to a material which serves as filler material or as a matrix in which diamond or other ultrahard particles are dispersed. Typically, the bonding medium can chemically bond with the binder agent and/or diamond particles, although some mechanical bonding is often also present. Non-limiting examples of suitable bonding medium materials can include cubic boron nitride, tungsten carbide, boron, silicon nitride, and the like.

As used herein, "substantial" when used in reference to a quantity or amount of a material, or a specific characteristic thereof, refers to an amount that is sufficient to provide an effect that the material or characteristic was intended to provide. The exact degree of deviation allowable may in some cases depend on the specific context. Similarly, "substantially free of" or the like refers to the lack of an identified element or agent in a composition. Particularly, elements that are identified as being "substantially free of" are either completely absent from the composition, or are included only in amounts which are small enough so as to have no measurable effect on the composition.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As a non-limiting example of this principle, although PCD and ceramics are listed as ultrahard materials each has unique properties which may make it more or less suitable in a given circumstance. Further, these materials are often considered distinct classes of materials with very different considerations in manufacture and use. It is not the purpose of this specification to exhaustively outline every possible distinction among potentially useful components, but rather to illustrate the principles of the present invention, often with the use of such lists.

As a point of reference, volume and weight percents are used throughout the specification and are distinct from one another. Further, volume percents are calculated to exclude void space and interstitial space in a material or between particles. For example, a quantity of 100 wt % diamond would have less than 100 vol % diamond due to interstitial voids. The actual deviation between weight and volume percents will, of course, vary depending on the particle size and other components of the composition.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 micron to about 5 microns" should be interpreted to include not only the explicitly recited values of about 1 micron to about 5 microns, but also include individual values and sub-ranges within the indicated range. Thus, included in this numerical range are individual values such as 2, 3, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

Weldable Ultrahard Inserts

Figure 2:
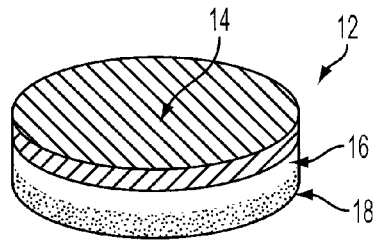
FIG. 2 is a side perspective view of a weldable ultrahard insert having a support layer in accordance with one embodiment of the present invention.

In accordance with the present invention, a weldable ultrahard insert can include an ultrahard working layer and a weldable metal layer metallically bonded with the working layer. As shown in FIG. 2, a weldable ultrahard insert 12 can include an ultrahard working layer 14 and an optional support layer 16 between the working layer and the weldable metal layer 18.

The ultrahard working layer can be formed of any useful ultrahard material. Non-limiting examples of suitable ultrahard materials include or consist essentially of polycrystalline cubic boron nitride, polycrystalline diamond, metal carbide, ceramic, diamond, silicon nitride, alumina, cermet, composites thereof, or combinations thereof. In one detailed aspect, the currently preferred ultrahard working layer can include a material such as polycrystalline diamond, polycrystalline cubic boron nitride, or tungsten carbide. The ultrahard material can also include conventional or unconventional thermally stable materials such as, but not limited to, acid leached polycrystalline PCD, nonporous silicon bonded PCD, grindable PCD (low diamond concentration ~60%-70%), or the like.

The weldable metal layer 18 can be formed of any material which can be welded to a tool substrate. Non-limiting examples of materials which can be used in the weldable metal layers of the present invention include, but are not limited to, steels, transition metals, and alloys thereof. In one specific aspect of the present invention, the weldable metal layer can include a stainless steel or low carbon steel. In another detailed aspect of the present invention, the weldable metal layer can comprise or consist essentially of low carbon steel. Specific non-limiting examples of particularly suitable low carbon steels include low carbon steel with nickel (AISI 2317, AISI 2515), low carbon steel with molybdenum (AISI 4012), and low carbon steel with high chromium content (AISI 405). The laser weldable material can be readily available in industry such as almost any grade of stainless steel (304, 316L, 17-4 ph, etc.), low carbon steel, low carbon alloy steels, nickel-chrome super alloys (Inconel, etc.), steels (aluminized steel, etc.), molybdenum, cobalt, tantalum, transition metals (e.g. Co, Cr, Ni, Ta, Ti, W, Mo, etc.), and their alloys. The weldable metal layer can have any functional thickness. However, as a general guideline thicknesses from about 0.1 mm to about 1 mm can be useful.

As shown in FIG. 2, the weldable ultrahard inserts 12 of the present invention can include a support layer 16. The support layer can be adjacent the ultrahard working layer and a primary weldable layer 18 opposite the ultrahard working layer. The support layer can be any suitable material which can provide support to the ultrahard working layer and can be bonded thereto directly or indirectly via a second material. In one aspect the support layer can comprise or consist essentially of a metal carbide. Typically, cemented tungsten carbide can be used although other materials may also be suitable.

Figure 3:
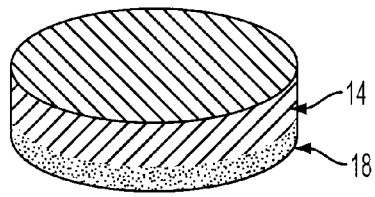
FIG. 3 is a side perspective view of a weldable ultrahard insert having no support layer in accordance with one embodiment of the present invention.

The ultrahard working layer 14 can be supported as shown in FIG. 2 or can be free-standing as shown in FIG. 3. FIG. 3 illustrates an embodiment wherein the ultrahard working layer 14 is directly bonded to a weldable layer 18. Typically, an intermediate layer can be used in such embodiments using free-standing polycrystalline bodies in order to improve bonding between the PCD or PcBN and the weldable layer. However, an intermediate layer can be used in either embodiment in order to improve bonding between the ultrahard working layer or support layer and the primary weldable layer.

In one detailed aspect, the weldable metal layer can further comprise an intermediate layer between the support layer and the primary weldable layer. The intermediate layer can be chemically bonded with the support layer and the primary weldable layer. In this manner the intermediate layer acts as a transition or bonding layer between two layers which may otherwise exhibit less bonding. The intermediate layer can be helpful in reducing delamination and improving overall strength of the weldable inserts of the present invention. In one aspect, the intermediate layer can include a carbide former. Non-limiting examples of suitable carbide formers can include nickel, cobalt, chromium, vanadium, alloys thereof, and the like. In one aspect, the carbide formers can be nickel, cobalt or alloys thereof.

Methods of Forming Weldable Ultrahard Inserts

The weldable ultrahard inserts of the present invention can be formed using a variety of methods. As a general matter, weldable ultrahard inserts can be formed by charging a reaction vessel with an ultrahard material. A weldable metal layer can be placed adjacent the ultrahard material in the reaction vessel to form a precursor assembly. The precursor assembly can be subjected to a pressure and a temperature sufficient to metallically bond the weldable metal layer to the ultrahard material. Each of these steps can include different variations and can be performed simultaneously or in reverse order, i.e. the steps of charging the reaction vessel with ultrahard material and placing a weldable metal layer.

The reaction vessel can be charged with an ultrahard material which includes preformed or powdered precursor compositions. Any conventional ultrahard powdered precursor composition can be used such as, but not limited to, diamond powder, cubic boron nitride, silicon, boron, titanium, sintering aids, bonding medium, binder agent, scavengers, and other known additives.

Alternatively, the ultrahard material can be a preformed ultrahard material. For example, existing PCD, PCBN, or metal carbide inserts can be charged into the reaction vessel. Under these conditions, it can be desirable to perform maintain the temperature and pressure at a conditions which are insufficient to substantially damage the preformed ultrahard material. As a general guideline when using preformed ultrahard materials, the temperature can be from about the melting point of the intermediate or weldable material at interface and the pressure can be from about atmospheric to about 10 kb. It should be understood that conditions outside those listed may also be used depending on the specific materials used.

As mentioned above, the ultrahard material can be any number of materials. Particularly preferred ultrahard materials include polycrystalline diamond, polycrystalline cubic boron nitride, and tungsten carbide.

The weldable layer can also be provided as a powdered material or as a solid disc, e.g. a sintered metal or consolidated green body. In one specific embodiment of the present invention, the weldable metal layer can comprise at least one metal disc. Alternatively, the weldable metal layer can comprise at least one particulate layer. In an additional optional embodiment, the weldable metal layer can include a first support layer disc adjacent the ultrahard material and a primary weldable material adjacent the support layer disc and opposite the ultrahard material.

The support layer disc can also be provided as a metal sintered disc, a consolidated mass, or as a particulate layer. The support layer disc is provided to form the support layer mentioned above and can be formed of suitable starting materials. In one currently preferred embodiment, the support layer disc can comprise a metal carbide. Similarly, primary weldable material can comprise any suitable weldable material as outlined previously. Currently preferred primary weldable materials can include steel, transition metal, and alloys thereof. The weldable material can be provided in the form of powder, foil, or disc. Further, although a variety of thicknesses can be suitable, the weldable layer thickness is typically in the range of about 0.01 mm to about 5.0 mm or even thicker than 5 mm in some special cases where a long shank is desired. Further, the reaction vessel can also be charged with a suitable material for forming an optional intermediate layer between the support layer and the primary weldable material. As with the other layers, the intermediate layer can be supplied as a particulate or solid.

In a more specific embodiment of the present invention, the weldable ultrahard inserts can consist of a weldable layer next to the tungsten carbide or other support layer substrate for ultrahard materials such as PCD or PCBN. These weldable ultrahard inserts can be made through a chemical bonding with an aid of high temperature metal bonding agent (e.g. cobalt or nickel) under in situ HPHT process where conventional PCD and PCBN are sintered. For instance, a conventional PCD of 3.2 mm thick product can now exhibit similar PCD product quality and performance of 3.2 mm thick to the tungsten carbide layer in accordance with the present invention. Although the above dimensions are outlined, the layer thickness of ultrahard material, support layer, and weldable metal layer can vary from product to product depending on its application. It is also noted that a metal bonding agent of cobalt, molybdenum, or nickel can be used between WC substrate of PCD and stainless steel layers for improved chemical bonding at each interface.

The charged reaction vessel can then be subjected to a temperature and pressure sufficient to consolidate the materials to form the weldable ultrahard inserts of the present invention. The appropriate temperature and pressure can depend on the specific materials used and whether or not the ultrahard material is preformed. Typical conditions for use with preformed ultrahard materials are outlined above.

Generally, typical HPHT conditions can be used. Any suitable HPHT apparatus can be used such as, but not limited to, piston-cylinder, multi-anvils, belt devices, and any other suitable high pressure press. In accordance with the present invention the time can be from about 5 minutes to about 60 minutes, although other times may be useful. Although these variables can change depending on the specific composition and particle sizes, typically, the temperature can be from about 1350° C. to about 1450° C. and the pressure can be from about 45 kb to about 55 kb. Pressure and temperature conditions can be varied or can be adjusted in stages such that a lower temperature can be held for a time followed by an increase in temperature. Further, in order to prevent damage to the ultrahard material, higher temperature can be held for shorter periods of time. Suitable adjustments in process conditions can be determined readily based on the information provided herein.

Figure 4:
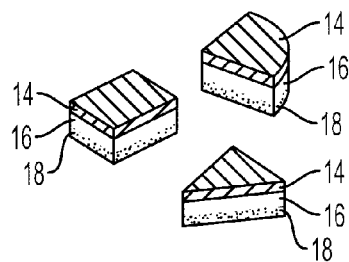
FIG. 4 is a perspective view of several inserts obtained from the insert of FIG. 2 in accordance with another embodiment of the present invention.

Subsequent to subjecting the precursor assembly to high temperature and pressure, the weldable ultrahard insert product can be recovered from the HPHT press. If necessary, the insert can be further cut into smaller inserts or cleaned in preparation for use or distribution. The weldable insert product can be machined using conventional machining such as, but not limited to, wire EDM, laser, or other suitable methods. For example, FIG. 4 illustrates several common insert shapes which are suitable for cutting and other applications. Further, the product can be cleaned or otherwise treated to improve appearance and/or performance.

Figure 5A:
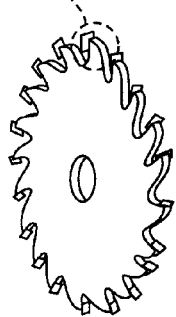
FIG. 5A is a perspective view of a PCD-tipped saw blade in accordance with still another embodiment of the present invention.
Figure 5B:
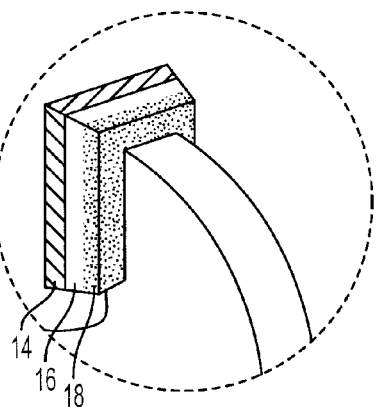
FIG. 5B is a perspective view of a weldable ultrahard insert welded to the saw blade of FIG. 5A in accordance with an embodiment of the present invention.
Figure 5C:
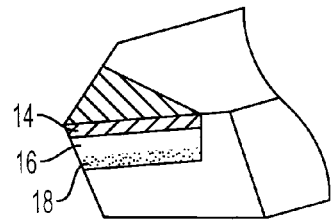
FIG. 5C is a perspective view of a weldable ultrahard insert welded to a cutter in accordance with another embodiment of the present invention.

As mentioned throughout, the resulting weldable ultrahard insert can be readily welded to a tool substrate using conventional welding techniques. The weldable metal layer is integrally bonded with the ultrahard working layer either directly or indirectly through support layers, intermediate layers, or the like. In this way, brazing can be avoided and simple welding can be used to directly bond the insert to a desired tool substrate. FIG. 5A illustrates a PCD-tipped saw blade having weldable PCD inserts welded thereto in accordance with the present invention. FIG. 5B is an enlarged view of one PCD tip showing the weldable PCD directly welded to the saw substrate. Similarly, FIG. 5C illustrates a weldable PCD insert welded directly to a tool holder. The weldable ultrahard inserts of the present invention can be used in a wide variety of applications which can include, but is in no way limited to, milling cutters, saw blades, end mills, bore heads, drill tips (e.g. oil and gas drilling), indexable tools, grinding tools, polishing tools, single point cutters, boring bars, turning tools, grooving tools, routers, and other machining tools.

Although any welding process can be used to weld the inserts of the present invention, focused welding processes such as laser welding, electron beam welding, frictional welding, ultrasonic welding, tungsten inert gas (TIG), plasma welding, and the like are particularly suitable. Other methods such as resistance welding or others can also be suitable as long as the ultrahard material is not damaged by the welding process.

The following are examples illustrate various methods of making weldable ultrahard inserts in accordance with the present invention. However, it is to be understood that the following are only exemplary or illustrative of the application of the principles of the present invention. Numerous modifications and alternative compositions, methods, and systems can be devised by those skilled in the art without departing from the spirit and scope of the present invention. The appended claims are intended to cover such modifications and arrangements. Thus, while the present invention has been described above with particularity, the following Examples provide further detail in connection with several specific embodiments of the invention.

EXAMPLE 1

Typical PCD and PCBN having a 3.2 mm thickness and 38 mm diameter were made under standard HPHT PCD sintering conditions. Laser weldable PCD and PCBN were also formed in accordance with the present invention. All of the raw materials used were the same as for the conventional PCD and PCBN but extra materials for the weldable layer were prepared to allow attachment of the weldable stainless steel layer into the cemented tungsten carbide substrate of PCD and PCBN. The extra materials included a nickel (Ni) disc of 0.15 mm thick (as an intermediate layer) and a 2.0 mm thick 316 stainless steel (SS) disc (primary weldable layer).

The reaction cup loading was started by loading diamond (for PCD) and CBN (for PCBN) powders in the bottom of separate cups. A WC-disc was placed over the diamond powder followed by a Ni-disc, and then a SS-disc in a tantalum cup. A similar procedure was followed for the cBN powder.

Sintering of PCD and PCBN was conducted under HPHT conditions of 50 Kb and 1400° C. for 15 minutes of heat soak time. Both as-pressed PCD and PCBN were produced from two separate HPHT runs and then were ground down to a total thickness of 3.2 mm thickness and 38 mm diameter (OD). The top/bottom surfaces of the final PCD and PCBN were examined in order to check the quality of PCD and PCBN as well as the joining interface of each layer. The weldable SS-layer appeared as good as the other WC and the joint of WC/SS layers appears to be well bonded into the WC layer. The quality of both PCD and PCBN looked normal.

The PCD blank was then cut into small rectangle segments by wire EDM. One of these small segments was brazed onto a steel saw using a conventional brazing alloy and the remaining segments were laser welded for quality and strength confirmation.

EXAMPLE 2

The test of Example 1 was repeated with a cobalt disc placed as a bonding joint between WC-substrate of PCD or PCBN and the SS-disc. The resulting quality of weldable PCD and PCBN appeared substantially similar to the samples of Example 1. Another test was also made with an alloy of cobalt and nickel as a joining/intermediate layer and the final PCD looks good and overall joining quality at the interfaces is as strong as Example 1.

EXAMPLE 3

A similar test as in Example 1 was carried out with no interface joining metal disc in between WC and SS layer. In this example, the SS-disc as the weldable layer was contacted directly with the WC-disc of PCD and PCBN. Further, another test was also made using only a nickel disc as a weldable layer instead of a SS-disc. The PCD with WC-disc and SS-disc next to WC exhibited good joining at the interface of the WC and SS layers but the bond strength relative to Example 1 was not as good, but was still acceptable for many applications. The PCD made with WC and Ni-layer demonstrates an acceptable joining at the interface of WC/Ni layers and its bond strength is also shown as strong as Example 1 in striking tests.

EXAMPLE 4

A similar test was conducted with various ultrahard products such as a prototype of grindable PCD and other LPHT PCD in order to attach a laser weldable SS-layer. The products under normal HPHT conditions appear to be good in both product quality and interface layer quality at the joint.

EXAMPLE 5

A similar experiment was made with only tungsten carbide insert and no PCD or PCBN. Only a WC-disc was loaded in the cup followed by a Ni-disc. A SS-disc (1.0mm thick) was also placed on the Ni-disc in a tantalum cup. This product can be suitable for a laser weldable cemented carbide insert tool. Two joining conditions applied were both normal HPHT PCD/PCBN sintering conditions and LPHT (20 Kb, 1400° C.) conditions. Both products exhibited a high quality and the stainless steel layer was well attached into the WC-ultrahard material.

EXAMPLE 6

A low pressure, high temperature test was conducted with the already as-made tungsten carbide substrated PCD and PCBN to attach a weldable SS-disc to the WC-layer of existing PCD and PCBN. The finished 1.6 mm thick PCD was loaded into a tantalum cup and a intermediate layer of nickel was placed next to the WC-side of the PCD. A disc of 316 stainless steel was placed next to the nickel. The same type of HPHT cell was assembled as in previous Examples and subjected to lower pressure of about 20 Kb and 1350° C. for about 5 minutes. The weldable SS-disc appeared to be well bonded into the PCD WC-side. It is also noted that the pressure may not be a limiting factor for weldable layer attachment as long as PCD quality is not affected by the heating temperature.

EXAMPLE 7

The same test of Example 6 was made with other types of intermediate metal disc and SS-disc to explore a wider range of pressure region. The result showed that the pressure does not adversely affect results as long as the PCD and PCBN are not thermally damaged during the bonding process of weldable layer. The same results can apply to the cemented carbide tools, but the acceptable PT region will be wider since there is no practical limit in pressure-affect on cemented carbide. Literally, almost any pressure and desirable temperature for manufacturing weldable PCD and PCBN, and their variants with weldable layer can be performed in accordance with the present invention.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of making a weldable ultrahard insert, comprising the steps of:
   a) charging a reaction vessel with an ultrahard material;
   b) placing a weldable metal layer adjacent the ultrahard material in the reaction vessel to form a precursor assembly; and
   c) subjecting the precursor assembly to a pressure and a temperature sufficient to metallically bond the weldable metal layer to the ultrahard material.

2. The method of claim 1, wherein the ultrahard material is a powdered precursor composition and the temperature and pressure are sufficient to also consolidate the ultrahard material.

3. The method of claim 1, wherein the ultrahard material is a preformed ultrahard material and the temperature and pressure are insufficient to substantially damage the preformed ultrahard material.

4. The method of claim 1, wherein the ultrahard material is polycrystalline diamond, polycrystalline cubic boron nitride, or tungsten carbide.

5. The method of claim 1, wherein the weldable metal layer comprises at least one metal disc.

6. The method of claim 5, wherein the weldable metal layer comprises a first support layer disc adjacent the ultrahard material and a primary weldable material adjacent the support layer disc and opposite the ultrahard material.

7. The method of claim 6, wherein the support layer disc comprises a metal carbide.

8. The method of claim 6, wherein the primary weldable material comprises a member selected from the group consisting of steel, transition metal, and alloys thereof.

9. The method of claim 6, wherein the weldable metal layer further comprises an intermediate layer between the support layer and the primary weldable material, said intermediate layer includes a transition metal.

10. A method of attaching a weldable ultrahard insert which comprises an ultrahard working layer and a weldable metal layer metallically bonded with the working layer, comprising the step of welding the weldable metal layer to a tool substrate.

11. The method of claim 10, wherein the step of welding is laser welding, electron beam welding, or frictional welding.

* * * * *